(12) United States Patent
Kozakai et al.

(10) Patent No.: US 7,125,948 B2
(45) Date of Patent: Oct. 24, 2006

(54) SILICONE ADHESIVE AND SILICONE ADHESIVE FILM

(75) Inventors: Shouhei Kozakai, Gunma-ken (JP); Akio Suzuki, Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 197 days.

(21) Appl. No.: 10/676,146

(22) Filed: Oct. 2, 2003

(65) Prior Publication Data

US 2004/0068076 A1    Apr. 8, 2004

(30) Foreign Application Priority Data

Oct. 4, 2002    (JP) .............................. 2002-291843

(51) Int. Cl.
*C08G 77/12*    (2006.01)

(52) U.S. Cl. ............................ 528/32; 528/24; 528/15; 528/31; 528/34

(58) Field of Classification Search .................. 528/24, 528/15, 31, 32, 34
See application file for complete search history.

(56) References Cited

U.S. PATENT DOCUMENTS 5,340,887 A    8/1994    Vincent et al.

FOREIGN PATENT DOCUMENTS

| EP | 251 435 | * | 1/1988 |
| EP | 382 338 | * | 8/1990 |
| JP | 7-53871 A | | 2/1995 |
| JP | 7-53942 A | | 2/1995 |
| JP | 7-70541 A | | 3/1995 |
| JP | 9-67558 A | | 3/1997 |

\* cited by examiner

*Primary Examiner*—Kuo-Liang Peng
(74) *Attorney, Agent, or Firm*—Birch, Stewart, Kolasch & Birch, LLP

(57) ABSTRACT

A silicone adhesive comprises (A) a reaction mixture obtained by subjecting a partially condensed mixture of (i) a hydroxy-terminated diorganopolysiloxane and (ii) an organopolysiloxane copolymer having hydroxyl and alkenyl radicals and comprising $R^3_3SiO_{1/2}$ units and $SiO_2$ units, and (iii) a silicon compound having a silicon atom-bonded hydrogen atom and a silicon atom-bonded alkoxy radical to addition reaction in the presence of a platinum catalyst and (B) a crosslinking agent. The silicone adhesive exhibits at the initial a tackiness sufficient to fixedly secure a substrate. By press bonding another substrate to the adhesive-bearing substrate and heating them, the substrates can be firmly bonded together.

13 Claims, No Drawings

SILICONE ADHESIVE AND SILICONE ADHESIVE FILM

This invention relates to a silicone adhesive exhibiting pressure-sensitive adhesion to a variety of substrates upon initial compression, developing permanent adhesion upon heating and suited for use in semiconductor device manufacture, and a silicone adhesive film obtained by forming the adhesive into a film shape.

BACKGROUND OF THE INVENTION

Like silicone oils and silicone rubbers, silicone-based pressure-sensitive adhesives have heat resistance, freeze resistance, electric insulation, weather resistance, water resistance and non-toxicity characteristic of the polysiloxane structure involved. They are also highly adherent to fluoro-resins and silicone rubbers which are difficult to bond with organic polymer-based pressure-sensitive adhesives. Thus they comply with a wide variety of substrates and are used in a wide range of application. They are especially suited for use in the manufacture of electronic parts, because of high purity, high heat resistance, low Tg, low modulus of elasticity, high electric resistance and low dielectric constant.

Prior art silicone-based pressure-sensitive adhesives are used in the application where bond strength is not so required, for example, as protective tape, securing tape or masking tape and for substrate lamination. However, these adhesives are recently required to develop initially adhesive bond (or tackiness) and subsequently permanent adhesion to various substrates.

In one application, a silicone adhesive which changes from adhesive bond to permanent adhesion is expected, from the reliability standpoint of silicone resin, to find use as a dicing/die bonding tape which is believed useful in the manufacture of semiconductor devices.

In the manufacture of semiconductor devices, a large diameter silicon wafer is secured by a pressure-sensitive adhesive tape (known as dicing tape) and subjected to a dicing (sawing and separating) step where the wafer is divided into semiconductor chips. The chips are then peeled from the dicing tape. The chip thus taken out is secured to a lead frame with a curable liquid adhesive (or die bonding agent) through heat compression bonding. In the current industry, a simpler process is needed, and the contamination of semiconductor parts with fluid ingredients from the liquid adhesive is also an issue of concern. It is then desired to have a dicing/die bonding tape in the form of a pressure-sensitive adhesive sheet serving as both the pressure-sensitive adhesive layer of the dicing tape and the die bonding agent. The pressure-sensitive adhesive (dicing)/die bonding layer needs to develop a tack force (or attachment) to withstand the dicing operation and to adhere to the chip being taken away in the initial dicing step and needs to further develop a strong bond to the lead frame in the subsequent die bonding step.

The pressure-sensitive adhesive (dicing)/die bonding layer of the dicing/die bonding tape is proposed in JP-A 9-67558 as comprising polyimide resins. On account of a high glass transition temperature (Tg) and a high modulus of elasticity, the polyimide resins are insufficient to mitigate the thermal stress between bonded substrates of semiconductor parts. To enhance reliability, there is a need for a dicing/die bonding tape comprising a silicone resin having a low Tg and a low modulus of elasticity enough for stress mitigation.

Silicone pressure-sensitive adhesives of the type that changes from tackiness to permanent adhesiveness are disclosed in JP-A 7-53871, JP-A 7-53942 and U.S. Pat. No. 5,340,887 (JP-A 7-70541). They establish a bond through crosslinking and curing with moisture. However, a long term of several days to several weeks is necessary until these pressure-sensitive adhesives acquire a substantial bond strength. Such extremely low productivity prevents the adhesives from being applied as the dicing/die bonding layer for use in the manufacture of semiconductor devices.

SUMMARY OF THE INVENTION

Therefore, an object of the present invention is to provide a silicone adhesive capable of developing initially adhesion and subsequently a strong bond to a substrate through brief heat compression so that it is applicable as the dicing/die bonding layer. Another object is to provide a silicone adhesive film obtained by forming the adhesive into a film shape.

We have discovered that by compounding a component having a silicon atom-bonded alkoxy radical introduced therein in a crosslinkable silicone pressure-sensitive adhesive composition comprising a chain-like organopolysiloxane and a solid state silicone resin, there is obtained an adhesive composition which develops a strong bond to a substrate through brief heat compression.

Accordingly, the present invention provides a silicone adhesive comprising (A) a reaction mixture and (B) a crosslinking agent. The reaction mixture (A) is obtained by subjecting a partially condensed mixture of (i) a diorganopolysiloxane having a hydroxyl radical at an end of its molecular chain, represented by the general formula (1):

wherein $R^1$ and $R^2$ each are a substituted or unsubstituted monovalent hydrocarbon radical, and m is an integer of 500 to 10,000, and (ii) an organopolysiloxane copolymer having hydroxyl and alkenyl radicals in a molecule and comprising $R^3{}_3SiO_{1/2}$ units and $SiO_2$ units as main units in a molar ratio of $R^3{}_3SiO_{1/2}$ units to $SiO_2$ units between 0.5 and 1.5, wherein $R^3$ is a hydroxyl radical or a substituted or unsubstituted monovalent hydrocarbon radical, and (iii) a compound of the general formula (2):

wherein $R^4$ and $R^5$ each are a substituted or unsubstituted monovalent hydrocarbon radical, and "a" is an integer of 0 to 2, to addition reaction in the presence of a platinum base catalyst.

Also contemplated herein are a silicone adhesive film prepared by forming the adhesive into a film shape, and a silicone rubber adhesive film prepared by forming the adhesive into a film shape, followed by crosslinking and curing.

DESCRIPTION OF THE PREFERRED EMBODIMENTS

Component (A)

Component (A) in the silicone adhesive of the invention is a reaction mixture obtained by performing addition reaction of (iii) a silicon compound having a silicon atom-bonded hydrogen atom and a silicon atom-bonded alkoxy radical to a partially condensed mixture of (i) a diorganopolysiloxane and (ii) an organopolysiloxane copolymer (or organosiloxane resin) in the presence of a platinum base catalyst.

Component (i) is a diorganopolysiloxane having a hydroxyl radical at an end of its molecular chain, represented by the general formula (1).

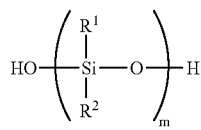
(1)

Herein $R^1$ and $R^2$ each are a substituted or unsubstituted monovalent hydrocarbon radical, and m is an integer of 500 to 10,000.

In formula (1), each of $R^1$ and $R^2$ is a substituted or unsubstituted monovalent hydrocarbon radical, preferably having 1 to 10 carbon atoms. Examples include alkyl radicals such as methyl, ethyl, propyl, butyl, pentyl, and hexyl, aryl radicals such as phenyl, tolyl and xylyl, halogenated alkyl radicals such as chloromethyl and 3,3,3-trifluoropropyl, and alkenyl radicals such as vinyl, allyl, butenyl and pentenyl, with methyl, vinyl and phenyl being preferred. In one embodiment wherein an organohydrogenpolysiloxane is used as component (iii) or crosslinking agent (B) and addition reaction performed in the presence of a platinum base catalyst, the diorganopolysiloxane (i) should contain alkenyl radicals. Also in another embodiment wherein the crosslinking agent (B) is an organic peroxide, the inclusion of alkenyl radicals is preferred. The content of alkenyl radicals is 0.0005 to 0.1 mol % based on the total of organic substituent radicals ($R^1$ and $R^2$). Outside the range, initial tackiness or adhesion after heating may not be achieved. The preferred alkenyl content is from 0.001 to 0.05 mol %. It is noted that at least two alkenyl radicals are included per molecule.

The subscript m is an integer of 500 to 10,000, preferably 1,000 to 5,000. If m is less than 500, the composition does not exhibit desired adhesive properties. If m is more than 10,000, formation of an adhesive layer becomes difficult.

Component (ii) is an organopolysiloxane copolymer having hydroxyl and alkenyl radicals in a molecule and comprising $R^3_3SiO_{1/2}$ units and $SiO_2$ units as main units. The molar ratio of $R^3_3SiO_{1/2}$ units to $SiO_2$ units is in the range between 0.5/1 and 1.5/1. If this molar ratio is less than 0.5 or more than 1.5, the inventive composition does not exhibit desired adhesive properties. The desired molar ratio is between 0.6/1 and 1.2/1. Like component (i), in one embodiment wherein an organohydrogenpolysiloxane is used as component (iii) or crosslinking agent (B) and addition reaction performed in the presence of a platinum base catalyst, the organopolysiloxane copolymer (ii) should contain alkenyl radicals. The content of alkenyl radicals should preferably be 0.005 to 0.2 mol per 100 g of the organopolysiloxane copolymer. Outside the range, initial tackiness or adhesion after heating may not be achieved. The more preferred alkenyl content is 0.01 to 0.1 mol. It is noted that for the copolymer, at least two alkenyl radicals are included per molecule, and at least one hydroxyl radical is included per molecule.

The organopolysiloxane copolymer may further contain $R^3_2SiO_{2/2}$ units or $R^3SiO_{3/2}$ units or both, insofar as these additional units do not compromise the desired properties of the copolymer, typically in an amount of up to 10 mol %, especially up to 5 mol % based on the total of $R^3_3SiO_{1/2}$ units and $SiO_2$ units.

With respect to the blending proportion, it is preferred to blend 30 to 70 parts by weight of component (i) with 70 to 30 parts by weight of component (ii), and more preferably 40 to 60 parts by weight of component (i) with 60 to 40 parts by weight of component (ii), provided that the total of components (i) and (ii) is 100 parts by weight. If the proportion of component (ii) is less than 30 parts by weight or more than 70 parts by weight, desired adhesive properties may not be achieved.

In the practice of the invention, components (i) and (ii) are partially condensed. The organopolysiloxane mixture of partially condensed components (i) and (ii) is obtained through partial condensation of hydroxyl (or silanol) radicals in these components. It can be obtained by a well-known technique, for example, by adding components (i) and (ii) to a suitable miscible solvent, adding ammonia as a condensation catalyst and heating the solution to effect dehydration condensation.

Component (iii) is to be reacted with the organopolysiloxane mixture for imparting adhesive properties to component (A). It is a silicon compound having a silicon atom-bonded hydrogen atom and a silicon atom-bonded alkoxy radical, represented by the general formula (2).

$$HR^4_aSi(OR^5)_{3-a} \qquad (2)$$

Herein $R^4$ and $R^5$ each are a substituted or unsubstituted monovalent hydrocarbon radical. Such hydrocarbon radicals are preferably those of 1 to 10 carbon atoms, for example, alkyl radicals such as methyl, ethyl, propyl, butyl, pentyl and hexyl, aryl radicals such as phenyl, tolyl and xylyl, and halogenated alkyl radicals such as chloromethyl and 3,3,3-trifluoropropyl. Inter alia, methyl and ethyl are preferred. The subscript "a" is an integer of 0, 1 or 2, preferably 0 or 1.

In the practice of the invention, the partially condensed organopolysiloxane mixture of components (i) and (ii) and component (iii) are subjected to addition reaction. Addition reaction is performed by heating the components in a suitable solvent and in the presence of any well-known platinum base catalyst.

The solvents used herein include those inert to component (iii), for example, toluene, xylene, hexane, heptane and ethanol. Examples of the platinum base catalyst include, but are not limited to, chloroplatinic acid, alcohol-modified chloroplatinic acid, and platinum-olefin complexes. The platinum base catalyst is typically used in an amount to give 0.1 to 1,000 ppm, preferably 1 to 500 ppm of platinum metal, based on the total weight of components (i), (ii) and (iii). Preferred heating conditions include a temperature of 40 to 120° C. and a period of about 2 to 6 hours.

Preferably the partially condensed organopolysiloxane mixture and component (iii) are blended in such proportions that the ratio of the molar amount Y of silicon atom-bonded hydrogen atoms (i.e., SiH radicals) in component (iii) to the molar amount X of alkenyl radicals in the partially condensed organopolysiloxane mixture, Y/X, is from 0.2 to 1.5, and more preferably from 0.5 to 1.2.

The addition reaction as described above results in the reaction mixture (A).

Where alkenyl radicals are necessary for crosslinking reaction to take place with the crosslinking agent (B), the reaction mixture (A) should contain alkenyl radicals. In order to keep alkenyl radicals left behind in the reaction mixture (A), the molar ratio Y/X, defined above, should be less than 1.0. In a preferred embodiment, component (iii) is blended and reacted in such amounts that 0.001 to 0.1 mole, more preferably 0.002 to 0.05 mol of alkenyl radicals are left per 100 g of the reaction mixture (A).

The absolute amount of component (iii) is preferably 0.5 to 10 parts by weight, more preferably 1 to 5 parts by weight per 100 parts by weight of components (i) and (ii) combined. Outside the range, less amounts of component (iii) may fail to achieve a sufficient adhesive force whereas larger amounts may cause a change with time during storage.

Component (B)

Component (B) is a crosslinking agent which can incur crosslinking of component (A). Most often, the crosslinking agent (B) is an organic peroxide or a combination of an organohydrogenpolysiloxane having silicon atom-bonded hydrogen atoms with a platinum base catalyst.

The crosslinking of component (A) induced by the organic peroxide takes place through either bonding between silicon atom-bonded hydrocarbon radicals in component (A) or bonding between alkenyl radicals, depending on the type of organic peroxide. In the latter case, it is requisite that component (A) contain alkenyl radicals. On the other hand, the crosslinking of component (A) induced by the organohydrogenpolysiloxane/platinum base catalyst system takes place through addition crosslinking between alkenyl radicals in component (A) and silicon atom-bonded hydrogen atoms in the organohydrogenpolysiloxane in the presence of the platinum base catalyst. It is requisite in this case too that component (A) contain alkenyl radicals.

Examples of suitable organic peroxides include benzoyl peroxide, bis(4-methylbenzoyl)peroxide, 2,4-dichlorobenzoyl peroxide, p-chlorobenzoyl peroxide, dicumyl peroxide, bis(t-butyl)peroxide, 2,5-dimethyl-2,5-bis(t-butylperoxy) hexane, and t-butylcumyl peroxide. The organic peroxide is used in an effective amount, preferably of 0.1 to 10 parts by weight, more preferably 0.5 to 5 parts by weight per 100 parts by weight of component (A).

In the other crosslinking agent (B) comprising an organohydrogenpolysiloxane/platinum base catalyst system, the organohydrogenpolysiloxane (a) should have at least two silicon atom-bonded hydrogen atoms (SiH radicals) in a molecule. It may have a straight, branched or cyclic structure. Illustrative examples are those having the following structural formulae.

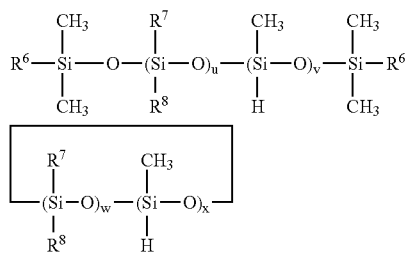

-continued

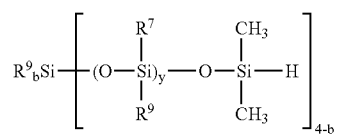

Herein $R^6$ is hydrogen or a monovalent hydrocarbon radical, $R^7$, $R^8$ and $R^9$ each are a monovalent hydrocarbon radical, u is an integer of 0 to 500, v is an integer of 2 to 500, x is an integer of 2 to 6, w is an integer of 0 to 4, y is an integer of 0 to 300, and "b" is an integer of 0, 1 or 2.

The organohydrogenpolysiloxane is preferably used in an amount to give 0.2 to 30 mol, more preferably 0.5 to 10 mol of silicon atom-bonded hydrogen atoms per mol of alkenyl radicals in component (A). If the amount of silicon atom-bonded hydrogen atoms is less than 0.2 mol or more than 30 mol, desired adhesive properties may not be achieved.

Examples of the platinum base catalyst (b) include, but are not limited to, chloroplatinic acid, alcohol-modified chloroplatinic acid, platinum-olefin complexes, platinum-vinylsiloxane complexes, platinum black, and solid platinum on carriers such as alumina and silica. The platinum base catalyst is used in a catalytic amount, preferably to give 0.1 to 1,000 ppm, more preferably 1 to 500 ppm of platinum metal based on the total weight of components (A) and (B).

In the case of the crosslinking agent (B) comprising an organohydrogenpolysiloxane/platinum base catalyst system, it is effective for ease of working to add a certain amount of a reaction inhibitor. Suitable inhibitors include acetylene alcohols, nitrogen-containing compounds, sulfur-containing compounds, and phosphorus-containing compounds.

While the silicone adhesive of the invention includes components (A) and (B) defined above, optional components may be added to the adhesive composition if necessary and insofar as this does not compromise the objects of the invention. For example, for ease of coating and forming of the inventive silicone adhesive, an organic solvent for dilution such as toluene, xylene, hexane, heptane, ethanol, isopropyl alcohol, acetone or methyl ethyl ketone may be used.

Also, various adhesive aids may be added for further improving the final adhesion of the composition. Suitable adhesive aids include alkoxysilane compounds having an alkenyl, (meth)acryloxy or epoxy radical such as vinyltrimethoxysilane, vinylmethyldimethoxysilane, vinyltriethoxysilane, acryloxypropyltrimethoxysilane, acryloxypropylmethyldimethoxysilane, acryloxypropyltriethoxysilane, methacryloxypropyltrimethoxysilane, methacryloxypropylmethyldimethoxysilane, methacryloxypropyltriethoxysilane, glycidoxypropyltrimethoxysilane, and glycidoxypropyltriethoxysilane. Also useful are siloxane compounds having two or more of SiH, alkoxy and epoxy radicals, examples of which are given below.

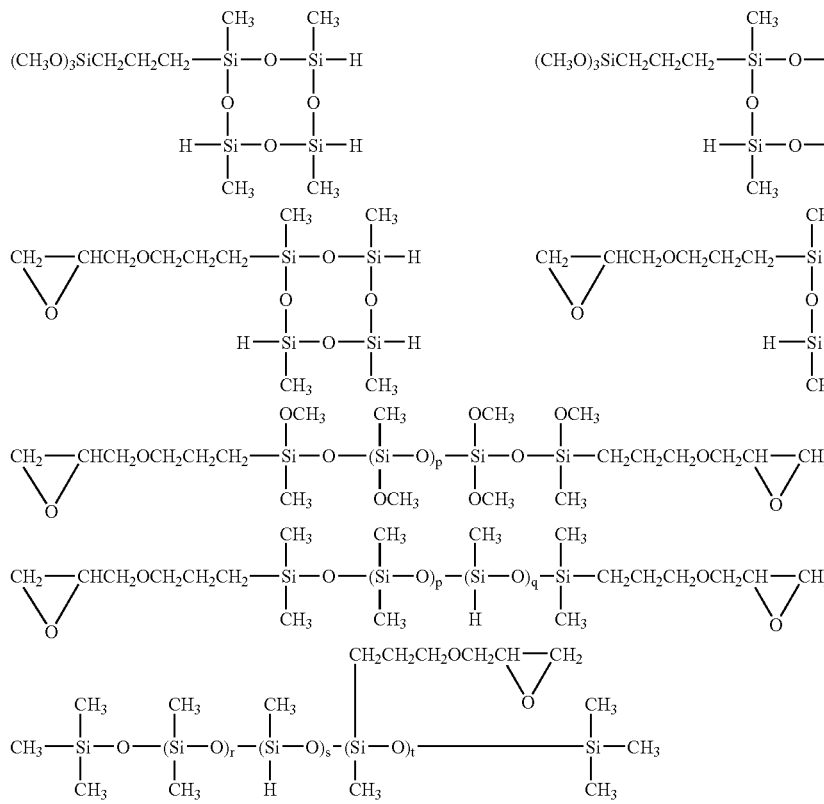
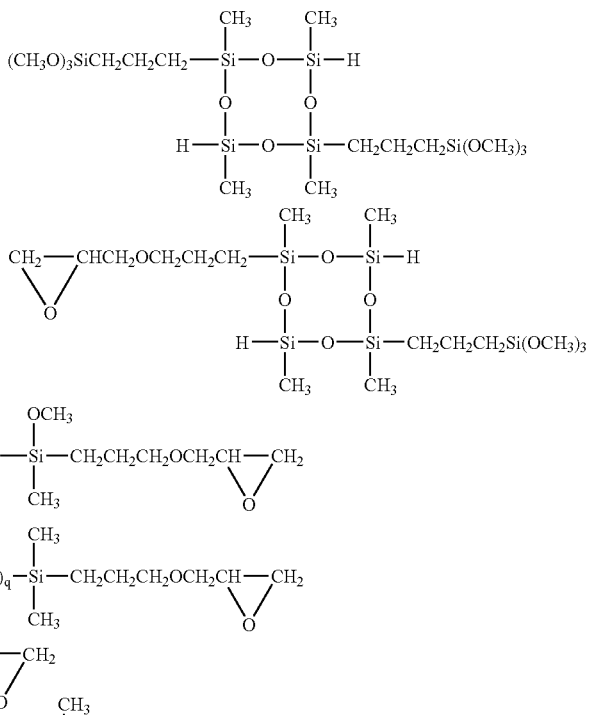

Note that p and r each are an integer of 0 to 50, q, s and t each are an integer of 1 to 50.

Of the adhesive aids, those having two or more silicon atom-bonded hydrogen atoms may also serve as the crosslinking agent (B).

Isocyanuric acid derivatives having alkoxysilyl and allyl radicals as shown below are also useful.

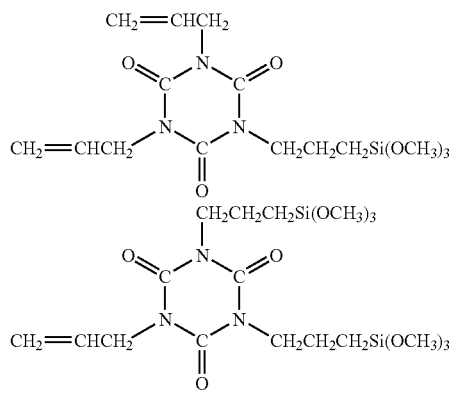

An appropriate amount of the adhesive aid used is 0 to 10 parts by weight, more preferably 0 to 5 parts by weight per 100 parts by weight of component (A).

For a certain purpose, other additives may also be incorporated, for example, fillers such as silica flour, titanium oxide, carbon black and electroconductive particles, inorganic or organic pigments, dyes and wetting agents.

The inventive silicone adhesive primarily comprising components (A) and (B) as described above may be used in several ways. A first way of use is by applying the adhesive directly onto one surface of a substrate (to be bonded) to a desired thickness. Alternatively a solution of the adhesive in a solvent is applied to one substrate surface and dried. Then a surface of another substrate is pressed to the adhesive layer to establish an adhesive bond. A desired step (temporary tack, sawing) is carried out, after which the assembly is heated to establish a bond.

A second way of use is to use the silicone adhesive in a tape form. The tape form is prepared by applying the silicone adhesive directly to a sheet-like support having a release agent coated thereon or by applying a solution of the adhesive in a solvent and drying, to form a silicone adhesive film, and laminating a backing sheet on top thereof to form a tape form. On use, the backing sheet is peeled from the tape form, the tape form is press bonded to a desired substrate, a desired step is carried out in this state, after which the remaining release sheet (support) is peeled off, and the tape form is press bonded to another substrate and heated to establish a bond. Alternatively, the tape form is press bonded to a desired substrate, the remaining release sheet (support) is then peeled off, the substrate having the adhesive film borne thereon is press bonded to another substrate, and a desired step is carried out in this state, after which the assembly is heated to establish a bond.

The application of the inventive adhesive to the dicing/die bonding tape corresponds to the former of the second way of use. More particularly, the release sheet is peeled from the film form, the film form is press bonded to a wafer, a dicing step is carried out in this state to saw and divide the wafer into semiconductor chips, after which each semiconductor chip having the silicone adhesive attached thereto is peeled from the remaining release sheet (support), press bonded to another substrate, typically a lead frame and heated to establish a bond, thereby fabricating a semiconductor device.

Suitable materials of which the sheet-like support used in the processing of the silicone adhesive into a film shape is made include polyethylene, polypropylene, polyester, polyamide, polyimide, polyamide-imide, polyether-imide, polytetrafluoroethylene, paper and metal foil, but are not limited thereto.

The thickness of the silicone adhesive film is not critical and may be selected as appropriate for a particular purpose. The film thickness is ordinarily in the range of 0.01 to 0.1 mm.

When a solution of the inventive silicone adhesive in a solvent is applied and dried to form an adhesive layer, the drying conditions which vary with a thickness include at least 2 hours at room temperature and 1 to 20 minutes at 40 to 130° C., both at a film thickness in the ordinary range. Moderate conditions are preferred if allowable. Higher temperatures in excess of 130° C. or longer heating times are undesirable because silicon atom-bonded alkoxy radicals in component (A) can be altered to inhibit adhesion. The inventive adhesive layer may be kept not only in a dry state with the solvent removed as mentioned above, but also in a crosslinked state as long as initial tackiness is maintained. The crosslinking conditions may be similar to the drying conditions. Moderate crosslinking conditions are preferred because higher temperatures or longer heating times can inhibit adhesion.

Preferred conditions under which the inventive silicone adhesive layer between various substrates is heated to establish a bond include a temperature of 100 to 250° C. and a time of 15 to 60 minutes.

The substrates to which the inventive silicone adhesive can be applied include metals such as Fe, Al, Cr, Ni, Si, Cu, Ag and Au; inorganic materials and ceramics such as glass, silicon nitride and silicon carbide; and organic materials such as epoxy, bakelite, polyimide, polyamide, polyester and silicone resins.

EXAMPLE

Synthesis Examples, Examples and Comparative Examples are given below for further illustrating the invention. These examples are not to be construed as limiting the invention thereto. All parts are by weight.

Synthesis Example 1 of Component (A)

In 200 parts of toluene were dissolved 100 parts of a methylpolysiloxane resin consisting of 0.678 mol of $(CH_3)_3SiO_{1/2}$ units, 0.072 mol of $(CH=CH_2)(CH_3)_2SiO_{1/2}$ units, and 1 mol of $SiO_2$ units (hydroxyl content or OH number: 0.06 mol/100 g methylpolysiloxane resin) and 100 parts of a gum-like dimethylpolysiloxane end-capped with a hydroxyl radical, containing 0.075 mol % (based on all the organic radicals bonded to silicon atoms, same hereinafter) of vinyl radicals as pendants and having a degree of polymerization of 2,000. To the solution was added 1.0 part of 28% aqueous ammonia. The solution was stirred at room temperature for 16 hours for condensation reaction to take place. By heating at 120–130° C., the condensation water was removed through azeotropic dehydration. The solution was cooled to room temperature, after which 100 parts of toluene was added, and a 2-ethylhexanol-modified chloroplatinic acid solution added in an amount to give 10 ppm platinum. After 30 minutes of stirring, 6.0 parts of trimethoxysilane was added to the solution, which was stirred for one hour. The solution was heated and stirred at 85–95° C. for 4 hours for effecting addition reaction. Toluene was added to the reaction solution to a nonvolatile concentration of 40% (150° C./30 min), yielding a silicone composition I.

Synthesis Example 2 of Component (A)

As in Synthesis Example 1, a silicone composition II was synthesized using 100 parts of a methylpolysiloxane resin consisting of 0.685 mol of $(CH_3)_3SiO_{1/2}$ units, 0.065 mol of $(CH=CH_2)(CH_3)_2SiO_{1/2}$ units, and 1 mol of $SiO_2$ units (hydroxyl content or OH number: 0.07 mol/100 g methylpolysiloxane resin), 100 parts of a gum-like dimethylpolysiloxane end-capped with a hydroxyl radical, containing 0.075 mol % of vinyl radicals as pendants and having a degree of polymerization of 2,000, 100 parts of toluene, 1.0 part of 28% aqueous ammonia, an amount to give 10 ppm platinum of a 2-ethylhexanol-modified chloroplatinic acid solution, and 6.0 parts of trimethoxysilane.

Synthesis Example 3 of Component (A)

As in Synthesis Example 1, a silicone composition III was synthesized using 100 parts of a methylpolysiloxane resin consisting of 0.725 mol of $(CH_3)_3SiO_{1/2}$ units, 0.025 mol of $(CH=CH_2)(CH_3)_2SiO_{1/2}$ units, and 1 mol of $SiO_2$ units (hydroxyl content or OH number: 0.05 mol/100 g methylpolysiloxane resin), 100 parts of a gum-like dimethylpolysiloxane end-capped with a hydroxyl radical, containing 0.075 mol % of vinyl radicals as pendants and having a degree of polymerization of 2,000, 100 parts of toluene, 1.0 part of 28% aqueous ammonia, an amount to give 10 ppm platinum of a 2-ethylhexanol-modified chloroplatinic acid solution, and 2.0 parts of trimethoxysilane.

Synthesis Example 4 of Component (A)

As in Synthesis Example 1, a silicone composition IV was synthesized using 100 parts of a methylpolysiloxane resin consisting of 1.02 mol of $(CH_3)_3SiO_{1/2}$ units, 0.08 mol of $(CH=CH_2)(CH_3)_2SiO_{1/2}$ units, and 1 mol of $SiO_2$ units (hydroxyl content or OH number: 0.06 mol/100 g methylpolysiloxane resin), 100 parts of a gum-like dimethylpolysiloxane end-capped with a hydroxyl radical, containing 0.075 mol % of vinyl radicals as pendants and having a degree of polymerization of 2,000, 100 parts of toluene, 1.0 part of 28% aqueous ammonia, an amount to give 10 ppm platinum of a 2-ethylhexanol-modified chloroplatinic acid solution, and 6.0 parts of trimethoxysilane.

Synthesis Example 5 of Component (A)

As in Synthesis Example 1, a silicone composition V was synthesized using 100 parts of a methylpolysiloxane resin consisting of 1.026 mol of $(CH_3)_3SiO_{1/2}$ units, 0.074 mol of $(CH=CH_2)(CH_3)_2SiO_{1/2}$ units, and 1 mol of $SiO_2$ units (hydroxyl content or OH number: 0.07 mol/100 g methylpolysiloxane resin), 100 parts of a gum-like dimethylpolysiloxane end-capped with a hydroxyl radical and having a degree of polymerization of 2,000, 100 parts of toluene, 1.0 part of 28% aqueous ammonia, an amount to give 10 ppm platinum of a 2-ethylhexanol-modified chloroplatinic acid solution, and 6.0 parts of trimethoxysilane.

Comparative Synthesis Example 1 of Component (A)

In 200 parts of toluene were dissolved 100 parts of a methylpolysiloxane resin consisting of 0.738 mol of $(CH_3)_3SiO_{1/2}$ units, 0.012 mol of $(CH=CH_2)(CH_3)_2SiO_{1/2}$ units, and 1 mol of $SiO_2$ units (hydroxyl content or OH number: 0.06 mol/100 g methylpolysiloxane resin) and 100 parts of a gum-like dimethylpolysiloxane end-capped with a hydroxyl radical, containing 0.075 mol % of vinyl radicals as pendants and having a degree of polymerization of 2,000. To the solution was added 1.0 part of 28% aqueous ammonia. The solution was stirred at room temperature for 16 hours for condensation reaction to take place. By heating at 120–130° C., the condensation water was removed through azeotropic dehydration. Toluene was added to the reaction solution to a nonvolatile concentration of 40% (150° C./30 min), yielding a silicone composition VI.

Comparative Synthesis Example 2 of Component (A)

As in Comparative Synthesis Example 1, a silicone composition VII was synthesized using 100 parts of a methylpolysiloxane resin consisting of 1.1 mol of $(CH_3)_3SiO_{1/2}$ units and 1 mol of $SiO_2$ units (hydroxyl content or OH number: 0.05 mol/100 g methylpolysiloxane resin), 100 parts of a gum-like dimethylpolysiloxane end-capped with a hydroxyl radical and having a degree of polymerization of 2,000, 100 parts of toluene, and 1.0 part of 28% aqueous ammonia.

From the silicone compositions I to VII as component (A), silicone adhesive coating solutions were prepared as shown below in Examples and Comparative Examples.

Example 1

A silicone adhesive coating solution was prepared by mixing 100 parts of silicone composition I as component (A), 1.28 parts of an organopolysiloxane compound having silicon atom-bonded hydrogen atoms represented by the structural formula below and an amount to give 5 ppm platinum of a 2-ethylhexanol-modified chloroplatinic acid solution as component (B), and 0.05 part of 3-methyl-1-butyn-3-ol as a reaction inhibitor.

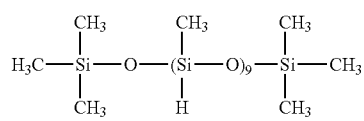

Example 2

A silicone adhesive coating solution was prepared by mixing 100 parts of silicone composition I as component (A), 5 parts of an organopolysiloxane compound having silicon atom-bonded hydrogen atoms represented by the structural formula below and an amount to give 5 ppm platinum of a 2-ethylhexanol-modified chloroplatinic acid solution as component (B), and 0.05 part of 3-methyl-1-butyn-3-ol as a reaction inhibitor.

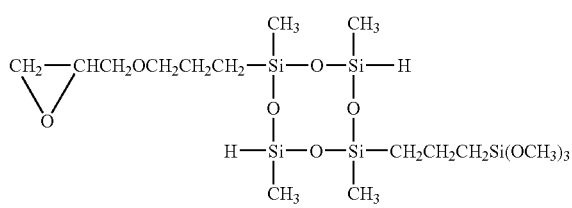

Example 3

A silicone adhesive coating solution was prepared by mixing 100 parts of silicone composition II as component (A), 0.47 part of the organopolysiloxane compound having silicon atom-bonded hydrogen atoms used in Example 1 and an amount to give 5 ppm platinum of a 2-ethylhexanol-modified chloroplatinic acid solution as component (B), and 0.05 part of 3-methyl-1-butyn-3-ol as a reaction inhibitor.

Example 4

A silicone adhesive coating solution was prepared by mixing 100 parts of silicone composition III as component (A), 0.47 part of the organopolysiloxane compound having silicon atom-bonded hydrogen atoms used in Example 1 and an amount to give 5 ppm platinum of a 2-ethylhexanol-modified chloroplatinic acid solution as component (B), and 0.05 part of 3-methyl-1-butyn-3-ol as a reaction inhibitor.

Example 5

A silicone adhesive coating solution was prepared by mixing 100 parts of silicone composition IV as component (A), 0.47 part of the organopolysiloxane compound having silicon atom-bonded hydrogen atoms used in Example 1 and an amount to give 5 ppm platinum of a 2-ethylhexanol-modified chloroplatinic acid solution as component (B), and 0.05 part of 3-methyl-1-butyn-3-ol as a reaction inhibitor.

Example 6

A silicone adhesive coating solution was prepared by mixing 100 parts of silicone composition V as component (A) and 0.5 part of bis(4-methylbenzoyl)peroxide as component (B).

Comparative Example 1

A silicone adhesive coating solution was prepared as in Example 1 except that silicone composition VI was used instead of silicone composition I as component (A).

Comparative Example 2

A silicone adhesive coating solution was prepared as in Example 6 except that silicone composition VII was used instead of silicone composition V as component (A).

Measurement of Tackiness

Each of the silicone adhesive coating solutions of Examples and Comparative Examples was applied onto a polyimide film of 25 mm wide and 25 μm thick and heated at 120° C. for 5 minutes to form a silicone adhesive layer of about 50 μm thick, producing a pressure-sensitive adhesive tape. The tape with the coated surface down was longitudinally attached to a SUS27CP stainless steel plate (30 mm wide and 1.0 mm thick). A roller covered with a rubber sleeve of about 6 mm thick and having a weight of 2,000±50 grams was rolled once back and forth on the tape at a (press bonding) speed of about 300 mm/min for press bonding the adhesive tape to the steel plate. The assembly was allowed to stand at a constant temperature and humidity of 25±2° C. and 50±5% RH, respectively, over 30 minutes. Thereafter, the adhesive tape was turned back 180° and pulled away at a rate of 300 mm/min while a peeling force was measured. The results are shown in Table 1.

Measurement of Adhesiveness

Each of the silicone adhesive coating solutions of Examples and Comparative Examples was applied onto a PET film of 50 μm thick coated with a fluorosilicone parting agent and dried under either of two sets of conditions of holding at room temperature for 3 hours and heating at 120° C. for 5 minutes, to form a silicone adhesive layer of about 50 μm thick, producing an adhesive tape. The tape was cut into pieces of 25 mm long and 10 mm wide, which were attached to substrates of stainless steel (SUS), aluminum, silicon wafer, glass and polyimide film. The PET film was peeled off and a substrate of the same type was placed to sandwich the adhesive layer between the substrates. The sample was press bonded under a load of 2,000 grams for one minute. It was further heated at 175° C. for 60 minutes whereupon a shear bond strength was measured. The results are also shown in Table 1.

TABLE 1

| Molding conditions | Substrate | Example | | | | | | Comparative Example (unit: MPa) | |
|---|---|---|---|---|---|---|---|---|---|
| | | 1 | 2 | 3 | 4 | 5 | 6 | 1 | 2 |
| Tackiness | | | | | | | | | |
| 120° C./5 min | SUS | 8.6 | 6.5 | 9.2 | 9.1 | 8.8 | 8.9 | 8.3 | 8.8 |
| Adhesiveness | | | | | | | | | |
| RT/3 hr | SUS | 4.5 | 4.4 | 4.2 | 3.9 | 4.1 | 4.6 | 0.30 | 0.33 |
| | Aluminum | 4.7 | 4.6 | 4.6 | 4.3 | 4.6 | 4.8 | 0.31 | 0.35 |
| | Silicon wafer | 4.5 | 4.4 | 4.5 | 4.1 | 4.3 | 4.8 | 0.29 | 0.33 |
| | Glass | 4.8 | 4.8 | 4.9 | 4.3 | 4.6 | 4.9 | 0.32 | 0.34 |
| | Polyimide | 3.9 | 4.2 | 4.1 | 3.4 | 3.9 | 4.1 | 0.30 | 0.33 |
| 120° C./5 min | SUS | 2.7 | 2.1 | 2.0 | 1.8 | 2.5 | 1.9 | 0.26 | 0.51 |
| | Aluminum | 2.9 | 2.6 | 2.2 | 2.0 | 2.6 | 2.0 | 0.28 | 0.56 |
| | Silicon wafer | 2.6 | 2.2 | 2.2 | 2.0 | 2.3 | 1.8 | 0.22 | 0.49 |
| | Glass | 2.9 | 2.7 | 2.4 | 2.1 | 2.7 | 2.3 | 0.24 | 0.57 |
| | Polyimide | 2.1 | 1.9 | 2.0 | 1.7 | 2.1 | 1.7 | 0.25 | 0.51 |

The silicone adhesive of the invention exhibits at the initial a tackiness (or pressure-sensitive adhesion) sufficient to fixedly secure a substrate for allowing a desired step (cutting or the like) to be performed on the substrate. By press bonding another substrate to the adhesive-bearing substrate and heating them, the substrates can be firmly bonded together.

The silicone adhesive of the invention can be supplied in a film form which is easy to handle and avoids the contamination of the surrounding with fluid ingredients which occurs with liquid adhesives. Owing to these benefits, the silicone adhesive film of the invention can be advantageously used as the dicing/die bonding tape in the manufacture of semiconductor devices.

Japanese Patent Application No. 2002-291843 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A silicone adhesive comprising (A) a reaction mixture and (B) a crosslinking agent, which crosslinking agent (B) is a combination of (a) an organohydrogenpolysiloxane having at least two silicon atom-bonded hydrogen atoms in a molecule, said crosslinking agent (B) being present in an amount to give 0.2 to 30 mol of silicon atom-bonded hydrogen atoms per mol of alkenyl radicals in component (A), and (b) a catalytic amount of a platinum base catalyst,
said reaction mixture (A) being obtained by subjecting a partially condensed mixture of (i) a diorganopolysiloxane having a hydroxyl radical at each end of its molecular chain, represented by the general formula (1):

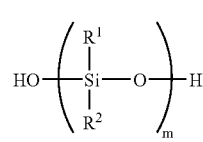

wherein $R^1$ and $R^2$ each are a substituted or unsubstituted monovalent hydrocarbon radical, the content of alkenyl radicals is 0.0005 to 0.1 mol % based on the total of $R^1$ and $R^2$, and m is an integer of 500 to 10,000, and (ii) an organopolysiloxane copolymer having hydroxyl and alkenyl radicals in a molecule and comprising $R^3{}_3SiO_{1/2}$ units and $SiO_2$ units as main units in a molar ratio of $R^3{}_3SiO_{1/2}$ units to $SiO_2$ units between 0.5 and 1.5, wherein $R^3$ is a hydroxyl radical or a substituted or unsubstituted monovalent hydrocarbon radical, and (iii) a compound of the general formula (2):

$$HR^4{}_a Si(OR^5)_{3-a} \qquad (2)$$

wherein $R^4$ and $R^5$ each are a substituted or unsubstituted monovalent hydrocarbon radical, and "a" is an integer of 0 to 2,
to addition reaction in the presence of a platinum base catalyst,
wherein the partially condensed organopolysiloxane mixture and component (iii) are blended in such proportions that the ratio Y/X, of the molar amount Y of SiH radicals in component (iii) to the molar amount X of alkenyl radicals in said partially condensed organopolysiloxane mixture, is less than 1.0, and wherein component (iii) is blended and reacted in such amounts that 0.001 to 0.1 mole of alkenyl radicals are left per 100 g of the reaction mixture (A).

2. A silicone adhesive film prepared by forming the adhesive of claim 1 into a film shape.

3. A silicone rubber adhesive film prepared by forming the adhesive of claim 1 into a film shape, followed by crosslinking and curing.

4. The silicone adhesive of claim 1, wherein $R^1$ and $R^2$ in component (i) each are a substituted or unsubstituted monovalent hydrocarbon radical selected from the group consisting of methyl, vinyl, and phenyl, the content of vinyl radicals being 0.0005 to 0.1 mol % based on the total of $R^1$ and $R^2$.

5. The silicone adhesive of claim 1, wherein the content of alkenyl radicals in component (i) is from 0.001 to 0.05 mol %.

6. The silicone adhesive of claim 1, wherein the molar ratio of $R^3{}_3SiO_{1/2}$ units to $SiO_2$ units in component (ii) is between 0.6 and 1.2.

7. The silicone adhesive of claim 1, wherein 40 to 60 parts by weight of component (i) are blended with 60 to 40 parts by weight of component (ii) per 100 parts by weight of the total of components (i) and (ii) in reaction mixture (A).

8. The silicone adhesive of claim 1, wherein in component (iii) $R^4$ and $R^5$ each are methyl or ethyl and "a" is an integer of 0 or 1.

9. The silicone adhesive of claim 1, wherein 1 to 5 parts by weight of component (iii) are combined with 100 parts by weight of the total of components (i) and (ii) in reaction mixture (A).

10. The silicone adhesive of claim 1, wherein the organohydrogenpolysiloxane (a) in crosslinking agent (B) is a compound of one of the formulae:

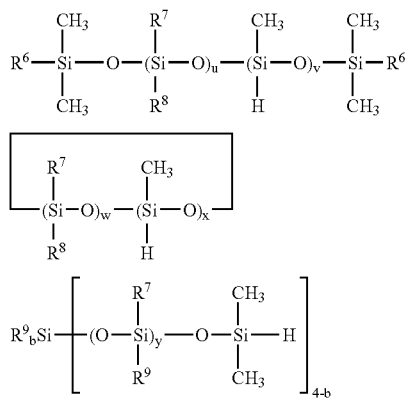

wherein $R^6$ is hydrogen or a monovalent hydrocarbon radical, $R^7$, $R^8$, and $R^9$ each are a monovalent hydrocarbon radical, u is an integer of 0 to 500, v is an integer of 2 to 500, x is an integer of 2 to 6, w is an integer of 0 to 4, y is an integer of 0 to 300, and "b" is an integer of 0, 1, or 2.

11. A silicone adhesive comprising (A) a reaction mixture and (B) an organic peroxide crosslinking agent, said reaction mixture (A) being obtained by subjecting to addition reaction in the presence of a platinum base catalyst a partially condensed mixture of (i) a diorganopolysiloxane having a hydroxyl radical at each end of its molecular chain, represented by the general formula (1):

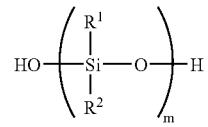

(1)

wherein $R^1$ and $R^2$ each are a substituted or unsubstituted monovalent hydrocarbon radical, and m is an integer of 500 to 10,000, and (ii) an organopolysiloxane copolymer having hydroxyl and alkenyl radicals in a molecule and comprising $R^3_3SiO_{1/2}$ units and $SiO_2$ units as main units in a molar ratio of $R^3_3SiO_{1/2}$ units to $SiO_2$ units between 0.5 and 1.5, wherein $R^3$ is a hydroxyl radical or a substituted or unsubstituted monovalent hydrocarbon radical, and (iii) a compound of the general formula (2):

$$HR^4_aSi(OR^5)_{3-a} \quad (2)$$

wherein $R^4$ and $R^5$ each are a substituted or unsubstituted monovalent hydrocarbon radical, and "a" is an integer of 0 to 2, wherein component (iii) and said partially condensed organopolysiloxane mixture are blended in such proportions that the ratio Y/X of the molar amount Y of silicon atom-bonded hydrogen atoms in component (iii) to the molar amount X of alkenyl radicals in the partially condensed organopolysiloxane mixture is from 0.2 to 1.5.

12. The silicone adhesive of claim 11, wherein the ratio Y/X is from 0.5 to 1.2.

13. The silicone adhesive of claim 11, wherein the organic peroxide crosslinking agent (B) is a member selected from the group consisting of benzoyl peroxide, bis(4-methylbenzoyl)peroxide, 2,4-dichlorobenzoyl peroxide, p-chlorobenzoyl peroxide, dicumyl peroxide, bis(t-butyl)peroxide, 2,5-dimethyl-2,5-bis(t-butylperoxy)hexane, and t-butylcumyl peroxide.

* * * * *